(12) United States Patent
Moya (10) Patent No.: US 10,526,225 B1
(45) Date of Patent: Jan. 7, 2020

(54) CONTINUOUS WATER FILTRATION, DISINFECTION AND CONSERVATION SYSTEM

(71) Applicant: Greencrown Water Systems, Inc., Belleville, NJ (US)

(72) Inventor: Emmanuel Moya, Mississauga (CA)

(73) Assignee: GREEN CROWN WATER SYSTEMS LLC, Belleville, NJ (US)

( * ) Notice: Subject to any disclaimer, the term of this patent is extended or adjusted under 35 U.S.C. 154(b) by 140 days.

(21) Appl. No.: 15/282,550

(22) Filed: Sep. 30, 2016

Related U.S. Application Data (60) Provisional application No. 62/236,439, filed on Oct. 2, 2015.

(51) Int. Cl.

| | |
|---|---|
| *C02F 9/00* | (2006.01) |
| *B01D 29/05* | (2006.01) |
| *B01D 21/26* | (2006.01) |
| *B01D 61/14* | (2006.01) |
| *B01D 71/02* | (2006.01) |
| *B01D 29/27* | (2006.01) |

(Continued)

(52) U.S. Cl.
CPC ............ *C02F 9/00* (2013.01); *B01D 21/267* (2013.01); *B01D 24/007* (2013.01); *B01D 24/12* (2013.01); *B01D 24/386* (2013.01); *B01D 24/402* (2013.01); *B01D 24/4636* (2013.01); *B01D 29/05* (2013.01); *B01D 29/27* (2013.01); *B01D 36/02* (2013.01); *B01D 61/147* (2013.01); *B01D 63/06* (2013.01); *B01D 71/02* (2013.01); *B01D 2024/125* (2013.01); *B01D 2101/02* (2013.01); *B01D 2101/04* (2013.01); *C02F 1/004* (2013.01); *C02F 1/281* (2013.01); *C02F 1/283* (2013.01); *C02F 1/325* (2013.01); *C02F 1/38* (2013.01); *C02F 1/444* (2013.01); *C02F 1/4691* (2013.01); *C02F 1/48* (2013.01); *C02F 1/505* (2013.01); *C02F 1/78* (2013.01); *C02F 2103/023* (2013.01); *C02F 2201/3227* (2013.01); *C02F 2201/4617* (2013.01); *C02F 2201/78* (2013.01); *C02F 2301/043* (2013.01); *C02F 2301/046* (2013.01); *C02F 2303/04* (2013.01)

(58) Field of Classification Search
None
See application file for complete search history.

(56) References Cited

U.S. PATENT DOCUMENTS 3,527,701 A * 9/1970 Weiler .................. B01D 15/00
210/259
3,586,294 A * 6/1971 Strong .................. B01D 21/02
366/163.2

(Continued)

*Primary Examiner* — Bradley R Spies
(74) *Attorney, Agent, or Firm* — Colin P. Abrahams (57) ABSTRACT

A water filtration and disinfection device comprises a water basin having an inlet for receiving water from a source. A sidestream treatment device is provided for treating water from the water basin, and the sidestream treatment device comprises a plurality of filtration or disinfection mechanisms for acting on water within the sidestream treatment device. A feed conduit extends between the water basin and the sidestream treatment device for feeding water from the water basin to the sidestream and a return conduit extends from the sidestream treatment device to the water basin for returning at least a part of the water to the water basin.

32 Claims, 11 Drawing Sheets

(51) Int. Cl.
  *B01D 24/12*  (2006.01)
  *B01D 24/38*  (2006.01)
  *B01D 24/46*  (2006.01)
  *B01D 36/02*  (2006.01)
  *C02F 1/00*  (2006.01)
  *C02F 1/32*  (2006.01)
  *C02F 1/38*  (2006.01)
  *C02F 1/78*  (2006.01)
  *B01D 63/06*  (2006.01)
  *B01D 24/00*  (2006.01)
  *B01D 24/40*  (2006.01)
  *C02F 1/50*  (2006.01)
  *C02F 1/28*  (2006.01)
  *C02F 1/44*  (2006.01)
  *C02F 1/469*  (2006.01)
  *C02F 103/02*  (2006.01)
  *C02F 1/48*  (2006.01)

(56) References Cited

U.S. PATENT DOCUMENTS

| | | | | |
|---|---|---|---|---|
| 4,451,361 A * | 5/1984 | Paterson | ........... | C02F 1/645 210/136 |
| 4,533,475 A * | 8/1985 | Chiarito | ........... | B01D 36/04 210/261 |
| 5,702,600 A * | 12/1997 | Pandolfo | ........... | C02F 1/485 204/660 |
| 5,938,900 A * | 8/1999 | Reynolds | ........... | C02F 1/4606 204/275.1 |
| 6,346,197 B1 * | 2/2002 | Stephenson | ........... | C02F 1/463 204/242 |
| 8,246,818 B2 * | 8/2012 | Korzeniowski | ...... | B01D 24/008 210/86 |
| 8,808,537 B1 * | 8/2014 | Livingston | ........... | C02F 9/005 210/196 |
| 2002/0014460 A1 * | 2/2002 | McKay | ........... | C02F 1/4606 210/696 |
| 2003/0132100 A1 * | 7/2003 | Crowe | ........... | A61L 2/14 204/164 |
| 2005/0199538 A1 * | 9/2005 | Knapp | ........... | E04H 4/1272 210/167.19 |
| 2006/0003882 A1 * | 1/2006 | Smith | ........... | B01D 17/005 494/49 |
| 2007/0138081 A1 * | 6/2007 | Rice | ........... | B08B 3/00 210/257.2 |
| 2007/0200262 A1 * | 8/2007 | Hills | ........... | B01F 3/04539 261/87 |
| 2008/0029383 A1 * | 2/2008 | Sakakibara | ........... | B01J 4/002 204/157.15 |
| 2009/0230035 A1 * | 9/2009 | Schulz | ........... | C02F 9/005 210/108 |
| 2010/0101999 A1 * | 4/2010 | Augier | ........... | B01D 15/1842 210/661 |
| 2010/0193430 A1 * | 8/2010 | Whiteman | ........... | C02F 3/12 210/610 |
| 2012/0172221 A1 * | 7/2012 | Skitt | ........... | A01K 63/04 504/150 |
| 2012/0261349 A1 * | 10/2012 | Kolstad | ........... | C02F 1/32 210/695 |
| 2012/0267299 A1 * | 10/2012 | Gebauer | ........... | B01D 15/206 210/198.2 |
| 2014/0158617 A1 * | 6/2014 | Dale | ........... | B01D 29/117 210/636 |
| 2014/0158636 A1 * | 6/2014 | Martin | ........... | B01D 29/01 210/747.6 |
| 2014/0190906 A1 * | 7/2014 | Fraim | ........... | B01D 21/262 210/787 |
| 2015/0305313 A1 * | 10/2015 | Licamele | ........... | A01K 63/04 119/204 |

* cited by examiner

FILTERING METHOD WITH WATER CONSERVATION AND DISINFECTION FEATURES FROM 100 MICRON DOWN TO 1 MICRON USING SILICON CARBIDE CERAMIC FILTER/S

CONTINUOUS WATER FILTRATION, DISINFECTION AND CONSERVATION SYSTEM

CROSS REFERENCE TO RELATED APPLICATIONS

This application claims the benefit of U.S. Provisional Patent Application No. 62/236,439 filed Oct. 2, 2015, the contents of which are incorporated herein in their entirety.

FIELD AND BACKGROUND OF THE INVENTION

This invention relates to a continuous water filtration and disinfection system. Further, the invention also relates to a system whereby water conservation can occur in the course of the filtration and disinfection processes. In one particular aspect, the invention is for a continuous water filtration and disinfection system, which may filter and disinfect water in a cooling tower, and which uses a centrifuge separator or a multi media filter in association with the cooling tower. The multimedia filter may comprise materials which include, amongst others, sand, zeolite resin and activated carbon. The system may further incorporate redundant disinfection devices, as well as anti-scaling frequency resonators.

A cooling tower, or reservoir for water received from a source, accommodates water which may contain many different types of impurities, both organic and inorganic. Some cooling towers or water reservoirs may have systems in place to treat the water in order to reduce or eliminate at least some of the impurities contained therein. Many of these treatments are inadequate for the purposes of reaching desirable degrees of water purity, and may include the addition of chemicals which may in themselves be harmful or even toxic, especially when used in larger doses.

The present invention is therefore directed towards a system and methods which reduce or may even eliminate impurities contained in a water storage reservoir or cooling tower. These systems and methods are designed as an integrated system, with an emphasis on nonchemical forms of treatment, although selected chemicals may be appropriately used in certain circumstances.

Preferably, the system is nonchemical in nature, and in one embodiment utilizes a side stream continuous filtration configuration.

SUMMARY OF THE INVENTION

According to one aspect of the invention, there is provided a water filtration and disinfection device comprising: a water basin having an inlet for receiving water from a source; a sidestream treatment device for treating water from the water basin, the sidestream treatment device comprising a plurality of filtration or disinfection mechanisms for acting on water within the sidestream treatment device; and a feed conduit between the water basin and the sidestream treatment device for feeding water from the water basin to the sidestream and a return conduit from the sidestream treatment device to the water basin for returning at least a part of the water to the water basin.

In one embodiment, rotating nozzles are provided in the water basin to increase water movement therein. Further, it may also be eductor nozzles in the water basin to increase water movement therein.

In one aspect, the invention comprises an electronic descaler for acting upon the water in the water basin at at least one location of in or adjacent the water basin. There may further be provided a frequency resonator for acting upon the water in the water basin.

Preferably, there is sintered screen within the water basin, which may be comprised of a frame, water tubes within the frame, and nozzles formed at selected locations of the water tubes. In one embodiment, the sintered screen comprises components which are connected to each other by magnets and magnet holders.

In one embodiment of the invention, the sidestream treatment device is a centrifugal separator. Preferably, the centrifugal separator comprises an ozone injection apparatus for injecting ozone into the water in the centrifugal separator. It may further comprise an ozone mixing zone vortex for facilitating the mixing of ozone and water in the centrifugal separator. The centrifugal separator may have associated therewith an ozone reaction and microfiltration vessel, which may includes a wedge wire micro filter.

In one form, a copper and silver ion injection device is provided for injecting copper and silver ions into the water. This may be located outside of the centrifugal separator. In another form, there may be a copper-silver ionization loop for water treatment upstream of the centrifugal separator.

The sidestream treatment device may further comprise a suction strainer, as well as a filter bag housing for filtering water downstream of the centrifugal separator. The filter bag housing may comprise a water sequestration system which includes one or both of a DC rectifier and a cathode.

In another embodiment, the sidestream treatment device comprises a multi media filtration system. The multimedia filtration system may comprise a filtration chamber comprising layers of the following: sand; zeolite; activated carbon; and pebble lime stones. The layers may have a sintered screen between them. Further, the filtration chamber may have a rotating wand with spray nozzles thereon formed in the filtration chamber.

Preferably, an array of UV light is located within the filtration chamber. Further, a copper/silver ionizer may be provided for introducing copper and silver ions into the water in the filtration chamber.

In a preferred embodiment, deflector plates are formed within the filtration chamber for deflecting water entering the filtration chamber. Further, a filter bag may be positioned outside of the filtration chamber, as may be a suction strainer.

An ozonator may be provided for the treatment of water after it has passed through the filtration chamber. Further, a precipitator may be provided for the treatment of water after it has passed through the filtration chamber.

In one embodiment, there may be provided a reservoir for filtered disinfected backwash water for selectively receiving water discharged from the filtration chamber and returning it to the filtration chamber through a micronic screen filter.

According to a further aspect of the invention, there is provided a method for the filtration and disinfection of water in a water basin, the method comprising: conducting the water through the water basin; providing nozzles within the water basin to facilitate circulation of the water therein; treating the water with ozone; treating the water with UV light; and treating the water by injection of copper and silver ions.

The water may be passed through a centrifugal separator, and at least some of the treatments occur within the centrifugal separator.

In another embodiment, the water is passed through a multimedia filtration system, at least some of the treatments occur within the multimedia filtration system.

In accordance with one aspect of the invention, there is thus provided a continuous filtration and disinfection system and method for the treatment of water in a water reservoir or cooling tower, and which may comprise mechanisms within the water reservoir itself, as well as a sidestream filtration system which is used in association with the water reservoir, whereby water in the water reservoir is conveyed into the side stream filtration system where it undergoes different treatments, and then is, at least in part, return to the water reservoir or cooling tower.

In one embodiment, the invention provides for such a sidestream filtration device and system which may potentially remove up to 90 to 99% of sediment, particulate, or other target impurities from the water. The sidestream filtration device may comprise either a centrifugal separator device or a multimedia filter in order to effect removal of, amongst other substances, submicronic particle size material, as may be selected. The sidestream filtration device is associated with the water reservoir or cooling tower so as to extract water there from, treated with filtration and disinfection, and return at least part of the waters to the cooling tower.

The invention may further comprise the use of basin sweeping rotating nozzles, eductors and related or similar type of equipment in order to prevent the accumulation of sediments which may form at the bottom of a cooling tower basin. The basin sweeping also preferably prevents the stagnation of water in the cooling tower or other reservoir, which may in turn results in the breeding of bacteria or other undesired contaminants. In one form of the invention, the nozzles discharge water so as to push the sediments toward a drain which may be formed in the cooling tower basin, and thereafter towards the suction of the filtration pump.

In accordance with the invention, there are various methods and systems by means of which disinfection can be achieved, and some of the preferred methods and systems are set forth below. One of the objectives of redundant disinfection is to ensure that there is 100%, or close to 100%, bacteria kill in cases where Legionella bacteria may be present.

Certain preferred mechanisms for disinfection include one or more of the following in selected or desired combinations and proportions:

Copper-silver ionization: Copper-silver ionization may achieve disinfection by dispersing positively charged copper and silver ions into the water. The introduction of these copper and silver ions may be positioned at strategic or preselected locations in order to achieve maximum for optimal efficiency. These ions may achieve disinfection by binding electrostatically with negative sites on, for example, bacterial cell walls, and result in, amongst other things, the denaturing of proteins. Over a period of time, this mechanism for introducing charged copper and silver ions may also cause the destruction and breakdown of biofilm, as well as other types of slimes, that can harbor Legionella, or other types of bacteria.

UV-light Dispersion: UV light dispersion is a mechanism for disinfection that uses short wavelength ultraviolet light to either kill or inactivate microorganisms. One way that this is achieved is by destroying nucleic acids and disrupting their DNA, which may leave them essentially inactivated and unable to perform vital cellular functions.

Ozonation: ozonation is a disinfection method and system which can be carried out by utilizing an electric discharge field, such as in the Corona discharge, or by ultraviolet radiation. Preferably, and in accordance with one embodiment of the invention, the effect of ozonation may be to create ozone concentration at levels of approximately 1%, or 10,000 mg/l. The oxidizing properties of ozone may reduce concentration of iron, manganese, sulfur, as well as other substances, and also facilitate in the reduction or even elimination of taste and odor which may be present in the water. In one form of the invention, these resulting insoluble particles may then be removed by filtration. It is also to be noted that ozone operates as an effective disinfectant over a wide pH range, rapidly reacting with bacteria, viruses and protozoans, which is a consequence of the strong germicidal properties of ozone.

The quality of influent or in flowing water can be determined using LSI/RSI indexes and criteria, and the following example of such criteria is provided, although the invention is not to be limited by this example:

pH/temperature—7.5-9.0/100 F
TDS—up to 1,000 ppm
Hardness—200 ppm
Conductivity—2,000 ppm
ORP—250-500 MV
Bacteria test by HTP or Paddle test for BOD5 or COD It is to be noted that the scope of the invention may include, but is not limited to, water treatment and disinfection of the following types and sources of water: city water; recycled treated water; and deep well water. The invention also facilitates water conservation and the results of the combination of processes and methods used in the treatment of the water, as well as the hardware for carrying out these processes.

In accordance with one aspect of the invention, there is provided the utilization of descaling methods which employ electro magnetic frequency resonation, and these may apply an electrostatic field to induce the precipitation of scale forming ions within the water. It can also affect and impact colloidal particles in the water, including, for example, bacteria and algae. These particles carry a surface electrical charge which attracts oppositely charged ions. This process may also be known as electrophoresis.

According to a further aspect of the invention, there is illustrated the effectiveness of an integrated solution for removing and preventing scale formation, bacteria, corrosion and biofilm control. The integrated solution includes utilization of several different devices and methods each selected for its ability and effectiveness in carrying out desired filtration and disinfection processes. These include, for example, copper-silver ionization, UV light treatment, ozonation, descaling, basin sweeping, and strategically located nozzles which may be able to rotate, several of which have been described herein. The invention may also promote water conservation, reduction of power consumption, and the removal of sediments and particulates. The invention may also prevent microbial growth, such as for example those in the form of algal formation.

DESCRIPTION OF THE DRAWINGS

Reference is now made to the accompanying drawings, illustrating various embodiments of the invention, in which.

DETAILED DESCRIPTION OF THE INVENTION

Many or most existing cooling tower systems have various types and degrees of problems. Some of these problems may include an inadequate and/or inappropriate use of chemicals, chemical imbalance due to less dosage, as the required high pH acidity (6 down to 5 or 4) allows bacteria growth and fouling. Furthermore, a high pH alkalinity (9.5 up to 11) may result in metal corrosion and scale formation.

Another problem with many existing cooling tower systems is that aqueous chemical use necessitates long contact times and metering devices required to dispense and monitor the chemicals. Additionally, under flow dosage conditions, these chemicals may be rapidly diluted.

The use of chemicals in this context may sometimes be effective, but when inadequate or inappropriate chemicals or dosages are used, the system becomes susceptible to fouling by turbidity, mineral content and precipitation due to evaporation within the water, as well as temperature and pH factors which become relevant in the system.

Problems in existing cooling towers or water reservoirs may also result due to inadequate or inappropriate use of filtration and filtering mechanisms. When too small, such mechanisms may be ineffective against the accumulation of solids. Conversely, when too large, such mechanisms use a significant amount of water and electricity. Additionally, when large, these mechanisms can occupy huge spaces, may be heavy and very large making transportation and set up awkward, difficult and expensive, and may further require a high degree of ongoing maintenance and operation.

In practice, many or most cooling tower installations either use only chemicals and depend on bleeding water, or utilize filtration systems. However, the size of these systems may be inadequate or incorrect for optimal effect. Some cooling tower installations may also use a combination of both of these methods.

Is also noted that some building operators simply rely on periodic cleaning of smaller cooling towers, and may use a plurality of such smaller cooling towers rather than fewer large towers, since large towers may be more difficult and expensive to maintain and operate.

The present invention therefore preferably comprises, in one embodiment, an integrated filtration and disinfection apparatus and system, which may have several features and benefits. Preferably, the invention does not, at least in one embodiment, use chemicals, and operates according to a nonchemical methodology. In situations where chemicals may be used, the introduction of such chemicals may be strictly modulated in order to ensure that the effects of these chemical additives are kept to a minimum so as not to adversarially effect environmental conditions or health. In this regard, selected chemicals may be used, as appropriate, in addition to the non-chemical mechanisms which define the invention. Preferably, in one aspect of the invention, chemical and nonchemical treatments are selected so that an optimal treatment system may be established which simultaneously is more healthy and has less impact on the environment.

The invention in one embodiment involves the provision of side stream filtration. This facilitates the effective accumulation of solids and sediments in the entire water body of the cooling tower and/or the condenser loop.

The invention also, in one embodiment, involves the provision of a basin sweeping mechanism. This facilitates a continuous cleaning of the basin water and reduces, prevents or eliminates stagnation. An optional spray mechanism may be incorporated into the system on fills, and this may prevent or reduce any fouling and accumulation of dust and precipitated scales. Rotating nozzles may also be strategically located at or near corners of the equipment, and is stagnant areas, or an appropriate selected areas, in order to ensure that sediments will not accumulate, or that they will be a reduction in such accumulation, in dead spots. This reduces or substantially prevents such areas from serving as a breeding ground for bacteria or other organic material.

The choice of the disinfection system selected, or the combination of systems used, may be determined according to the purpose or context in which it is used. Thus, copper-silver ionization may be effective to control microbial induced corrosion, bacteria, biofilm and algae. UV-light dispersion may be effective, at least to a certain degree (such as by turbidity and TDs) in killing and controlling bacterial growth. Ozonation may be effective not only in controlling and killing pathogens, viruses, protozoans and other forms of bacteria, but they may also be a good oxidizing agent for the reduction in the concentration of iron, manganese and sulfur. Ozonation may also have a beneficial effect insofar as the taste and odor of the water is concerned. This process may also be used in the tower basin, or water reservoir basin, and operates to prevent and control algae growth and odor.

Reference is now made to the accompanying drawings which illustrate some of the apparatus, systems and methods of the present invention. These apparatus, systems and methods are directed towards the continuous filtration and disinfection of water within a water basin or cooling tower, as well as the potential for water conservation therein, in a manner which is effective, with reduced environmental impact, healthier consequences, as well as other benefits.

In one aspect of the present invention, ions of copper and silver are carried through the entire filtration system, in the embodiments which comprise both the centrifugal separator and the multimedia filter. Further, ozone may be injected into the system, preferably by a vacuum created at the venturi which may be located at the vortex of the separator in the case of the centrifugal separator, and by the differential pressure created by a valve in the ozone (Mazzei) injection point in the case of the high-efficiency multimedia filtration system. Another purpose achieved by using ozone in this embodiment comprises its ability to reach "dead legs" in the system, which is a substantially stagnant or non-flowing area or space, and this may insure bacteria kill. The depletion and contact time of the ozone inside the cooling tower basin may prevent and control algal formation in the basin as well as the fills. During depletion of ozone inside the tower, vapors that are escaping through evaporation may come in contact with the ozone ensuring bacteria kill on aerosols and droplets in its surrounding area.

In the case of the use of electronic descalers utilized in accordance with the invention, which may also be called complex frequency resonators, the frequency created by the driver-controller at the range of 10 to 15 khz at the coil is sufficient to preferably restructure water molecules, allowing the separation and precipitation of calcium and magnesium carbonate. The reduction to such elements, because of their pH dependence, increases the pH of the water by about 1.0, elevating the pH condition of the water to a low alkaline condition of about 8.02 8.5. This makes the body of water easier to treat using fewer chemicals, or even a nonchemical system.

Figure 1:
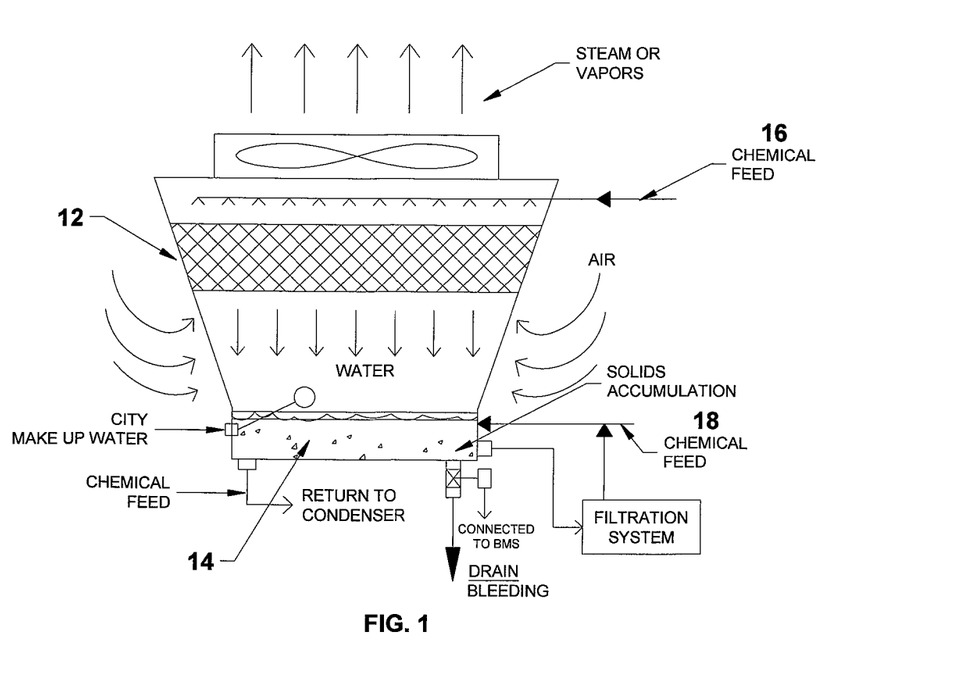
FIG. 1 is a diagram of a cooling tower water reservoir including a cooling tanks, and various chemical feeds.

FIG. 1 of the drawings shows a cooling tower or water basin 12 of standard cross flow design. The water entering the basin 12, which may be from one or several sources including a city supply, passes through a chamber 14 where there may be solids accumulation. Various chemical feeds are introduced for the purposes of treating all disinfecting the water, as indicated at points 16 and 18.

Figures 2A, 2B:
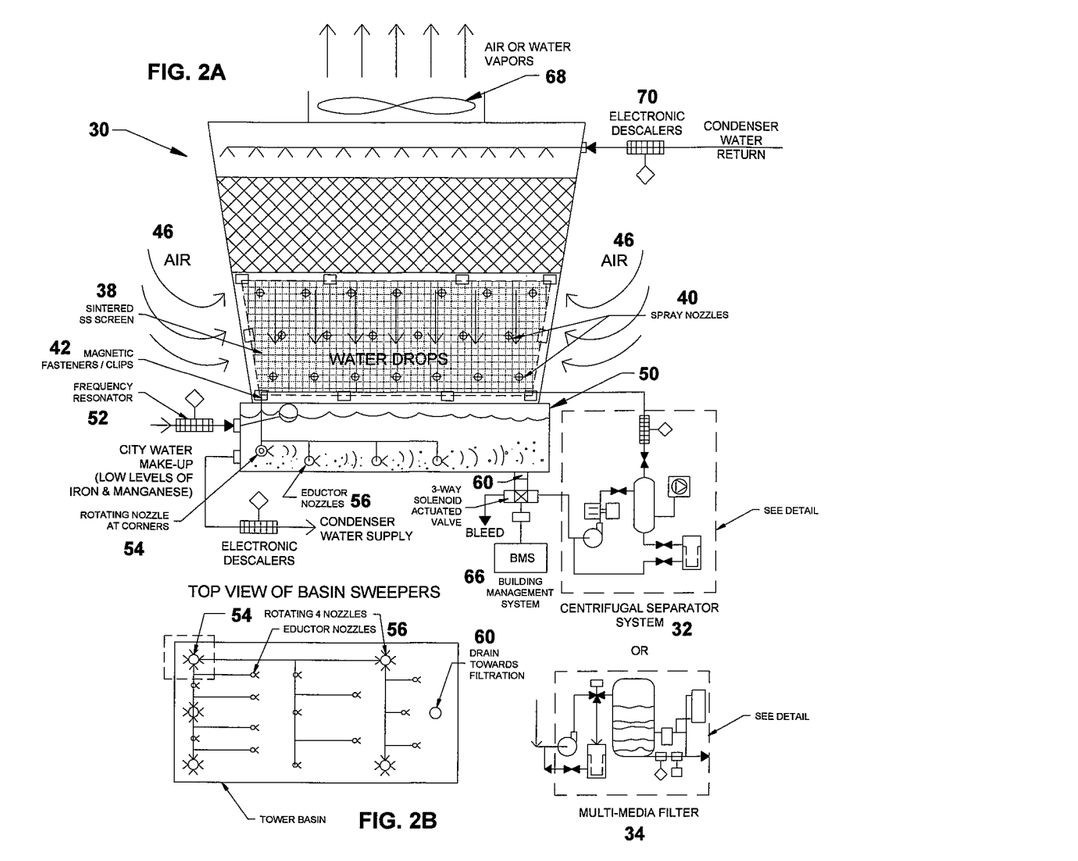
FIG. 2A shows a schematic view of a filtration and disinfection system in accordance with the present invention which may be configured with either a centrifugal filtration and disinfection device or a multi media filter, and which may include spray nozzles, electronic descalers, basin sweepers and multi media filters.
FIG. 2B is a top view of the cooling tower shown in FIG. 2A illustrating the basin sweepers.

FIGS. 2A and 2B shows schematically a diagram of a cooling tower 30 in accordance with one aspect of the invention. The cooling tower 30 has associated therewith either a sidestream filtration and treatment system in the form of a centrifugal separator system 32, or a sidestream filtration and treatment system in the form of a multi media filter 34. The cooling or water tower 30 comprises a reservoir for the water, and the water passes through a sintered screen 38 in an area which contains a plurality of spray nozzles 40. The screen 38 is held in position using magnetic fasteners or clips 42, which allows for easy removal and reassembly or replacement for maintenance and repair purposes. Air intake devices into the cooling tower 30 are illustrated by arrows 46.

The water then passes into a container 50, which has a number of filtration and disinfection mechanisms. These include the use of frequency resonators 52, and rotating nozzles 54, preferably formed at or near the corners of the container 50 in order to facilitate circulation and reduce stagnant or no flow areas or pockets. However, these may be located at any desired and selected point. Further, the water is treated by the eductor nozzles 56, which may be used for circulating and agitating the liquid, beneficial in that such movement helps to reduce or potentially eliminate the generation of organic or inorganic impurities which may form in the stagnant or slowly moving the water.

FIG. 2B shows a top view of the rotating nozzles 54 and the eductor nozzles 56 in the basin or container 50, indicating in one embodiment the positioning thereof so as to sweep the basin to ensure constant movement of the water. A drain 60 in the base of the basin 50 drains or extracts water through a conduit controlled by a three-way solenoid actuated valve, connected to a building management system 66, as an example. Further, water exiting through the drain 60 may be directed to one of the selected sidestream filtration devices, namely, the centrifugal separator system 32 or the multimedia filtration system 34, discussed in further detail below.

The cooling tower 30 further comprises fans 68 for processing air or water vapors, and includes a condenser water return conduit which may be acted upon by an electronic descalers 70 for returning water to the cooling tower 30.

Figures 3A, 3B, 3C:
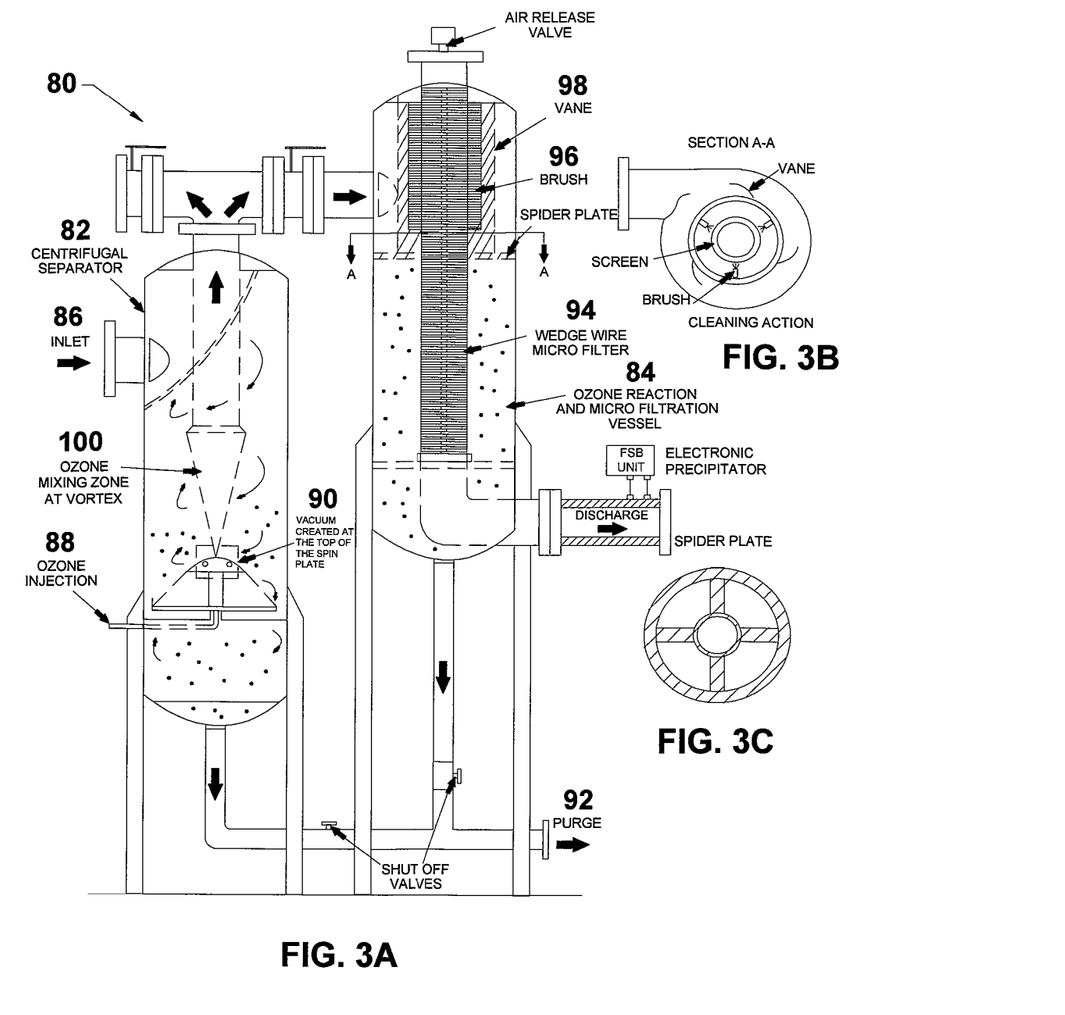
FIGS. 3A, 3B and 3C are more detailed schematic representations of a filtration and disinfection centrifugazone, shown generally in FIG. 2, in accordance with one aspect of the invention, including a centrifugal separator with an ozone mixing zone and ozone injection components, and ozone reaction and microfiltration vessel and components.

FIGS. 3A, 3B and 3C of the drawings show one embodiment of a centrifugal device 80 for treating the water. The centrifugal device 80 comprises a centrifugal separator 82 and an ozone reaction and microfiltration vessel 84. The centrifugal separator 82 receives water through inlet 86, and includes an ozone injection mechanism 88. A vacuum may be created at the top of the spin plate, as referenced generally at point 90, and separation occurs. One component is purged at 92, while another component passes to the ozone reaction and microfiltration vessel 84. This vessel 84 comprises a wedge wire micro filter 94, a brush 96, and a vane 98. In this embodiment, the water is treated with ozone, mixed with at the ozone mixing zone at the vortex 100. As described more fully above, ozonation represents one of the mechanisms by means of which the water treatment filtration and disinfection process is carried out. After passing through the ozone reaction and microfiltration vessel 84, and the wedge wire micro filter 94 therein, the discharge may be treated by an electronic precipitator.

Figure 4A:
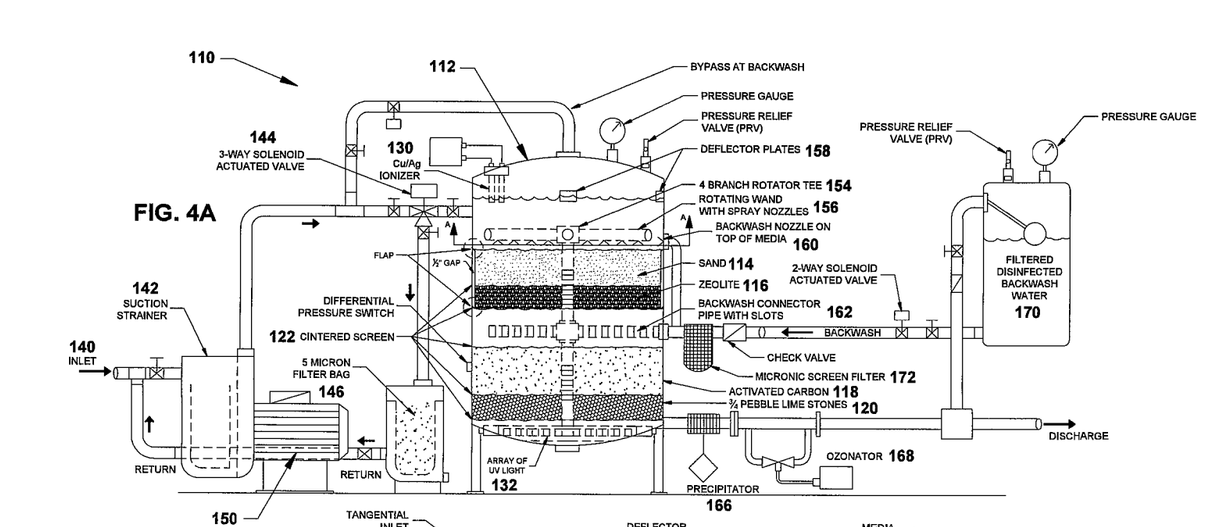
FIGS. 4A, 4B and 4C are more detailed schematic representation of a multi media filtration with disinfection system of the invention, shown generally in FIG. 2, including layers of sand, zeolite, activated carbon, pebble limestones and an array of UV light.

FIG. 4A of the drawings shows one embodiment of a multi media filter system 110 for carrying out the filtering and disinfection of the water. The system 110 includes a filtration chamber 112, the chamber 112 including various filter layers including sand 114, zeolite 116, activated carbon 118, and pebble lime stones 120. These layers are preferably separated from each other by a plurality of sintered screens 122 therebetween.

The chamber 112 includes a copper and silver ionizer 130, as well as an array of UV light 132, operating as a component of the disinfection system. Water is introduced into the filtration chamber 112 through an inlet 140, and passes through a suction strainer 142. A three-way solenoid actuated valve 144 controls the flow of water, so that it may enter into the chamber 112, or pass through a filter bag 146, which is preferably a 5 micron filter bag, although other side filters may of course be utilized. Circulation may be affected by the action a pump 150, which also acts as a vacuum.

The chamber also contains a four branch rotator tee 154, a rotating wand with spray nozzles 156, deflector plates 158, back wash nozzles 160 which may be formed on top of the media, and a backwash connector pipe 162, which may have slots, to facilitate proper circulation.

Further, on the outside of the chamber 112 in this embodiment, there is provided a precipitator 166 as well as an ozonator 168 for the water treatment. The water may be passed through a filtered disinfected backwash water device 170, and be further treated by passage through a micronic screen filter 172, en route to the backwash connector pipes 162 and through the filtration chamber 112.

Figure 4B:
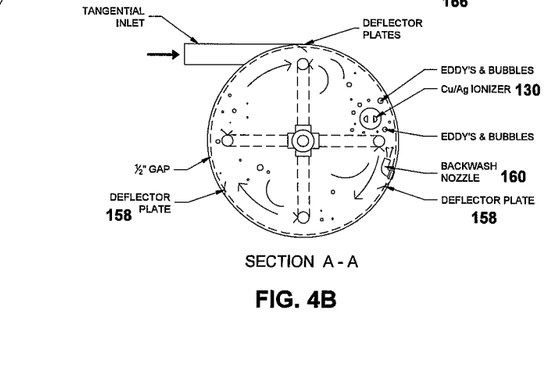
Figure 4C:
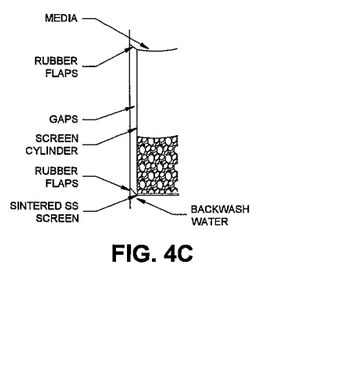

FIG. 4B shows a section through the chamber 112 at lines A-A, illustrating the positions of the deflector plate 158, backwash nozzles 160 and other structures. FIG. 4C shows a detail of a rubber flap on the side of the sand and zeolite media.

FIG. 4A shows important features of the invention including the positioning for the introduction of the copper-silver ions to the water. It further illustrates the injection of ozone to the filtered discharging water, as well as a self-sufficient backwash system 170. Water conservation may be achieved by returning filtered and treated liquid back to the process through the filter bag 146. The rotating nozzles prevent water stagnation and accumulation of dirt, while the spray of ozonated filtered water helps to eliminate, prevent or reduce the extent of algae growth.

Figure 5A:
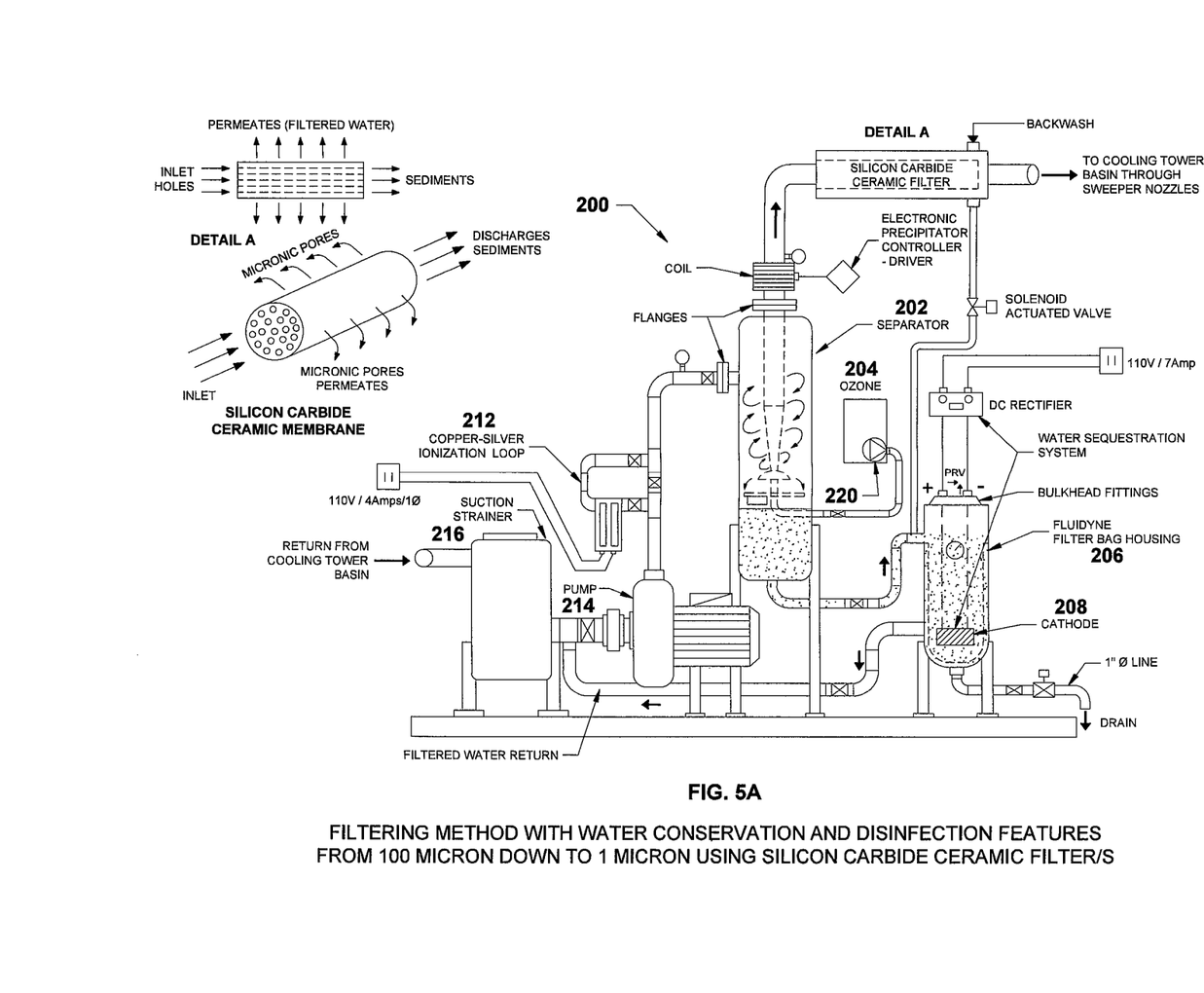
FIGS. 5A, 5B and 5C are related versions of a centrifugal separator system with disinfection in accordance with the invention including the use of a copper-silver ionization loop, ozone, electronic precipitator and other components.
Figures 5B, 5C:
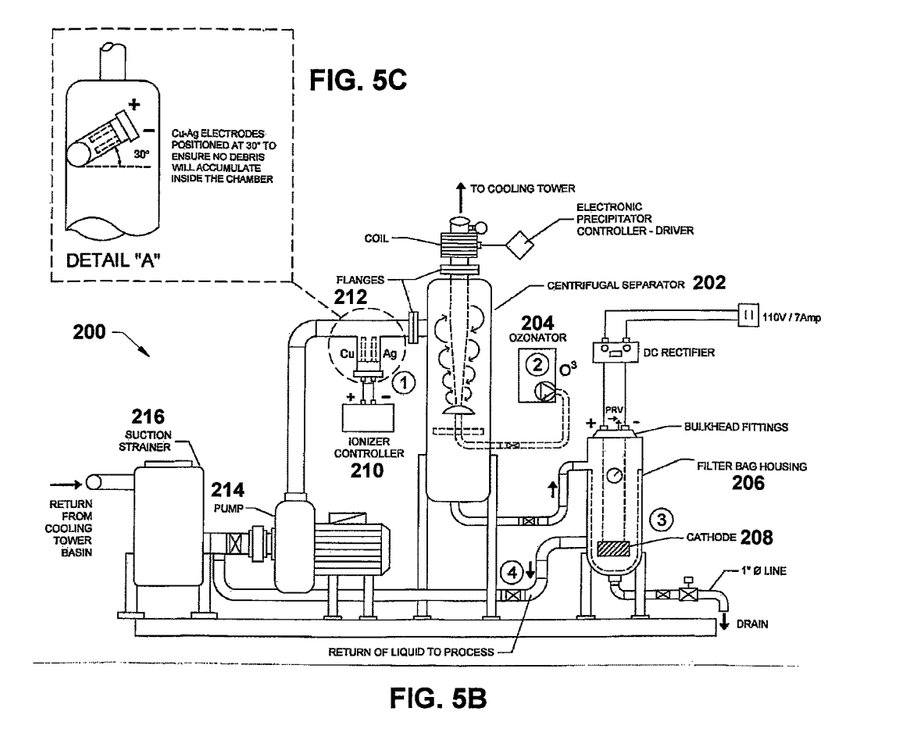

FIGS. 5A, 5B and 5C of the drawings show a centrifugal separator system in accordance with a further aspect of the invention. The system includes a separator 202, including an ozone injection mechanism 204. A filter bag housing 206 includes a cathode 208. The system further comprises an ionizer controller 210, and Cu—Ag electrodes 212, which may be positioned at about 30 degrees (best shown in the detail of FIG. 5B) to ensure that no, or at least a reduced amount of, debris accumulates inside the chamber. The water movement in the system is operated by a pump 214, which also serves as a vacuum. The system further comprises the suction strainer 216, which is connected to the cooling tower basin by means of a conduit.

In this embodiment illustrated in FIGS. 5A, 5B and 5C, there is shown a copper-silver ionizer which utilizes the fluid velocity in the dispersing of ions of copper-silver into the water. It is to be noted that the tangential release of copper-silver ions increases the bacteria killing effects thereof. Further, this figure illustrates that a vacuum created at the Venturi point at 220 is able to carry molecular ozone, using a mixing effect where there is a returning of water to the centrifugal separator.

There is also a sequestration of other dissolved metals in the liquid and solids by the use of the cathodic process for absorbing metals. Additionally, water conservation may be achieved by returning the filtered and treated liquid back to the process.

Figures 6A, 6B:
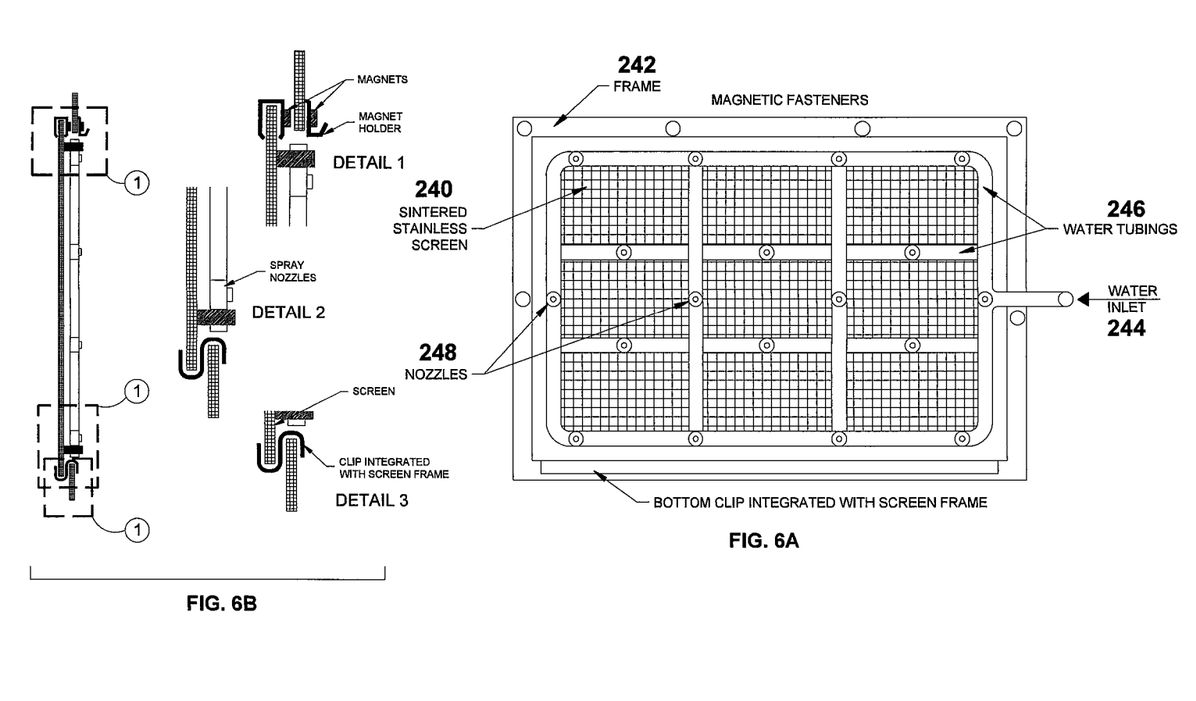
FIGS. 6A and 6B are a representation of details of the screen panel with spray nozzles, water tubing, magnetic fasteners and other hardware in accordance with one aspect of the invention.

FIG. 6A shows a screen panel comprised of a sintered stainless steel screen 240 mounted in a frame 242 with a water inlet 244 and water tubes 246. A plurality of nozzles 248 are arranged in the tubes 246. A plurality of magnetic fasteners and holders are used for efficiently fastening the screen and spray nozzles, as illustrated in the various details in FIG. 6B of the drawings.

Figure 7A:
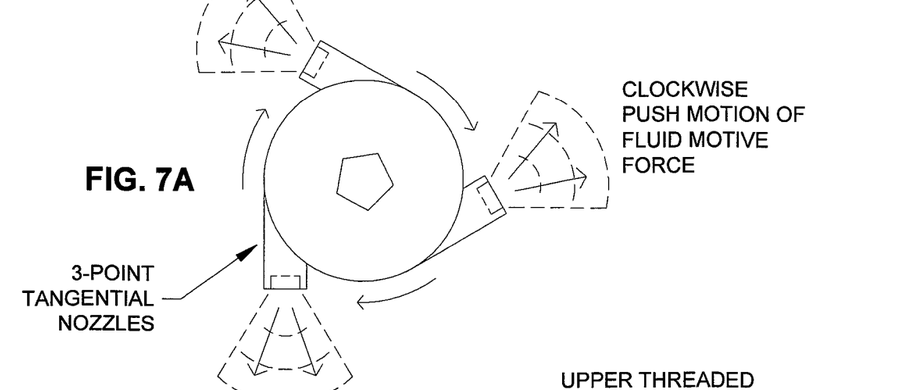
FIGS. 7A, 7B and 7C shows detailed views of a rotating nozzles in accordance with an aspect of the invention.
Figure 7B:
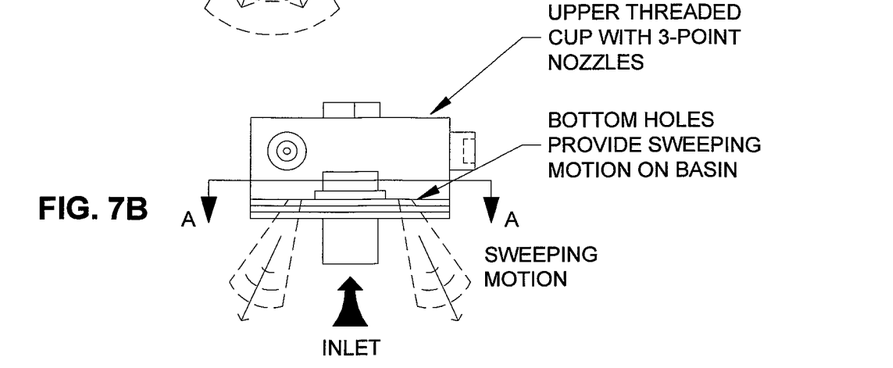
Figure 7C:
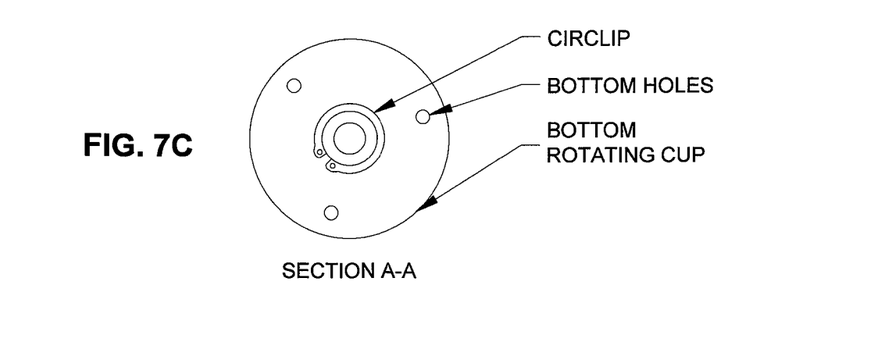

With reference to FIGS. 7A, 7B and 7C, there is shown a series of detailed illustrations of rotating nozzles in accordance with one aspect of the invention. FIG. 7A shows the three-point tangential nozzle configuration, with a clockwise push motion of the fluid motive force. FIG. 7B illustrates the upper threaded cup housing the three-point nozzles, and also bottom holes which provide a sweeping motion on the basin of the tower or container. FIG. 7C is a section through line A-A of FIG. 7B, illustrating the rotating bottom cup, the bottom holes, as well as the connector clip.

Figure 8:
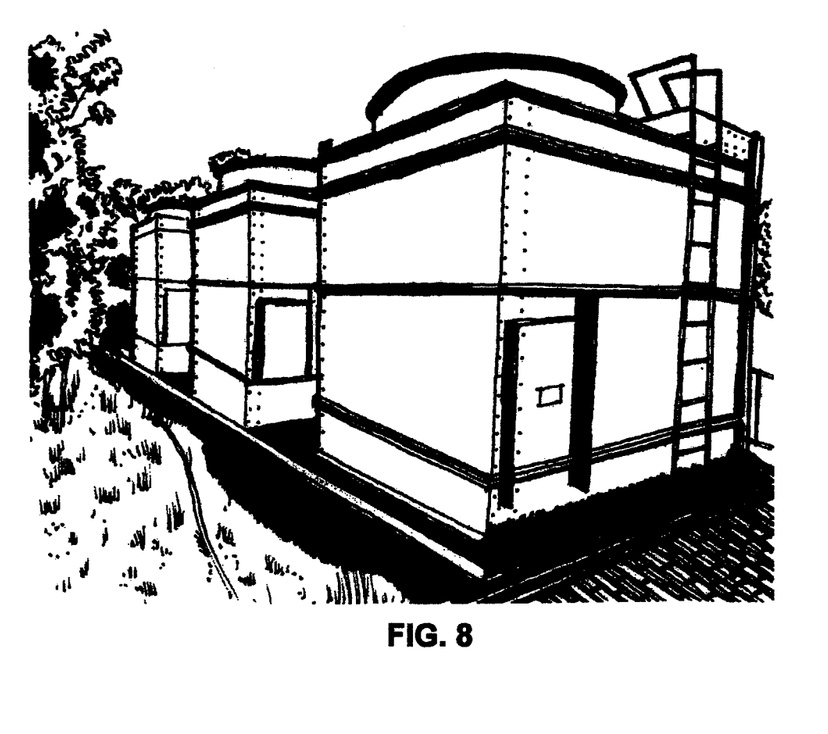
FIG. 8 shows a series of disinfection and treatment systems constructed in accordance with one aspect of the present invention.
Figure 9:
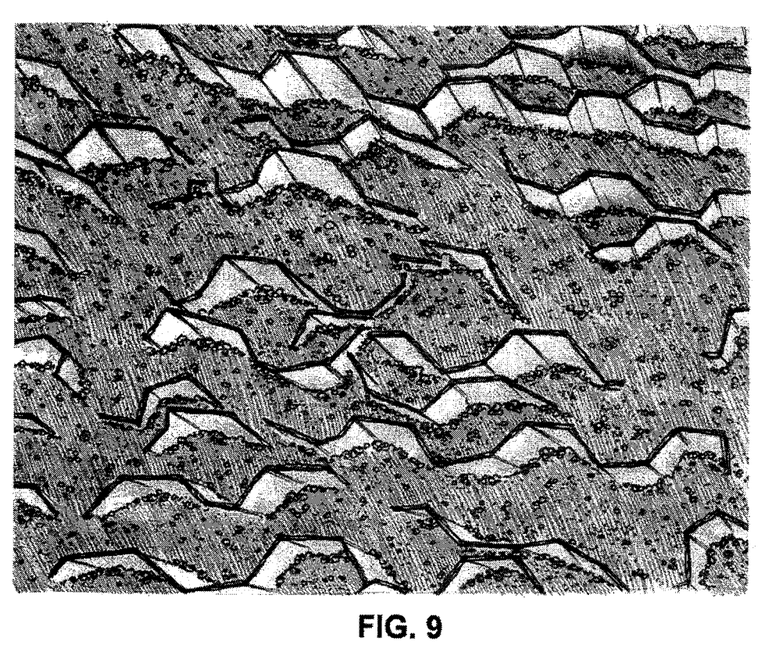
FIG. 9 shows a detail of cooling tower scales which may be used in accordance with an aspect of the invention.
Figure 10:
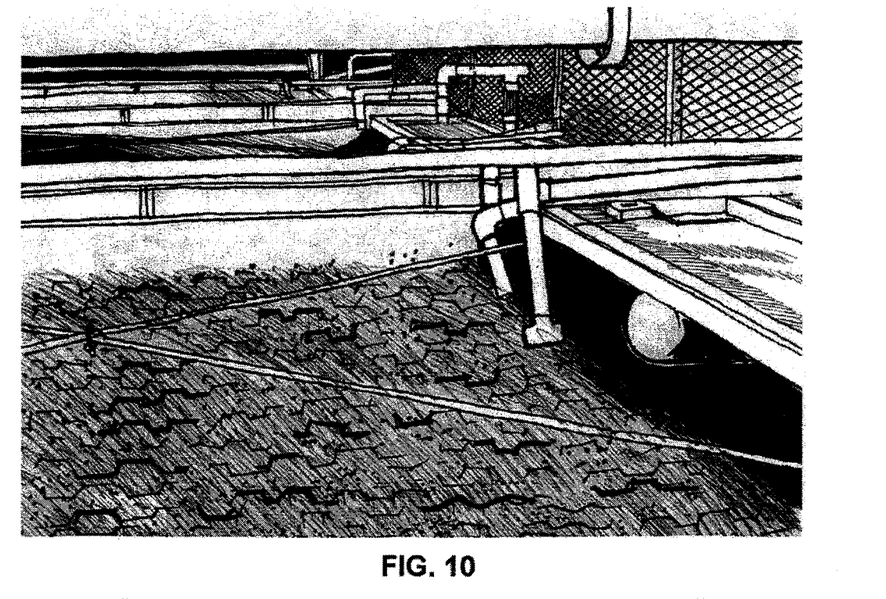
FIG. 10 is a further view of cooling towers scales and other hardware utilized in accordance with one aspect of the present invention.

FIG. 8 illustrates a series of disinfection and treatment systems constructed in accordance with one aspect of the present invention, while FIG. 9 shows a detail of cooling tower scales which may be used in accordance with an aspect of the invention. FIG. 10 of the drawings is a further view of cooling towers scales and other hardware utilized in accordance with one aspect of the present invention.

The treatment and disinfection apparatus, system and method in accordance with the present invention may offer a number of significant benefits. For example, the system may results in the reduction or elimination in the use of chemicals, which, while performing a function, may have many or prolonged deleterious effects. Further, the invention promotes a less toxic environment for humans, animal, plant and aquatic life. It may also facilitate water conservation and the reduction of blowdown water by approximately up to 90%, and makeup by approximately 60%. Thus, in one embodiment of the present invention, back washed or perched water would go through a full server bag housing where sediments are connected by the filter bag, and the filtered and treated water returns to the process through the operation of the suction pump.

The invention may also facilitate in the reduction or prevention of bacterial growth, biofilm and microbial induced corrosion. It may also result in the prevention and removal of old scale encrustations.

Further benefits may include the reduction in the amount of power consumption, and one of the reasons for this occurrence is that heat transfer efficiency increases as a result of less fouling as well as scale removal. Still further benefits include a potential advantageous effect in corrosion control, and production of magnetite coatings on affected areas.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A water filtration and disinfection device comprising:
   a water basin having an inlet for receiving water from a source;
   a sidestream treatment device for treating water from the water basin, the sidestream treatment device comprising a plurality of filtration or disinfection mechanisms for acting on water within the sidestream treatment device;
   a feed conduit between the water basin and the sidestream treatment device for feeding water from the water basin to the sidestream and a return conduit from the sidestream treatment device to the water basin for returning at least a part of the water to the water basin;
   a plurality of rotating nozzles located near the corners of the water basin to reduce accumulation of sediment and facilitate removal thereof; and a plurality of eductor nozzles formed within the water basin which are selectively positioned therein in a spaced relationship so as to agitate the water and facilitate water flow toward a drain in the water basin.

2. A water filtration and disinfection device as claimed in claim 1 further comprising rotating nozzles in the water basin to increase water movement therein.

3. A water filtration and disinfection device as claimed in claim 1 further comprising eductor nozzles in the water basin to increase water movement therein.

4. A water filtration and disinfection device as claimed in claim 1 further comprising an electronic descaler for acting upon the water in the water basin at at least one location of in or adjacent the water basin.

5. A water filtration and disinfection device as claimed in claim 1 further comprising a frequency resonator for acting upon the water in the water basin.

6. A water filtration and disinfection device as claimed in claim 1 further comprising a sintered screen within the water basin.

7. A water filtration and disinfection device as claimed in claim 6 wherein the sintered screen comprises a frame, water tubes within the frame, and nozzles formed at selected locations of the water tubes.

8. A water filtration and disinfection device as claimed in claim 6 wherein the sintered screen comprises components which are connected to each other by magnets and magnet holders.

9. A water filtration and disinfection device as claimed in claim 1 wherein the sidestream treatment device is a centrifugal separator.

10. A water filtration and disinfection device as claimed in claim 9 wherein the centrifugal separator comprises an ozone injection apparatus for injecting ozone into the water in the centrifugal separator.

11. A water filtration and disinfection device as claimed in claim 10 further comprising an ozone mixing zone vortex for facilitating the mixing of ozone and water in the centrifugal separator.

12. A water filtration and disinfection device as claimed in claim 9 wherein the centrifugal separator has associated therewith an ozone reaction and microfiltration vessel.

13. A water filtration and disinfection device as claimed in claim 12 wherein the ozone reaction and microfiltration vessel includes a wedge wire micro filter.

14. A water filtration and disinfection device as claimed in claim 9 further comprising a copper and silver ion injection device for injecting copper and silver ions into the water.

15. A water filtration and disinfection device as claimed in claim 14 wherein the copper and silver ion injection device is located outside of the centrifugal separator.

16. A water filtration and disinfection device as claimed in claim 9 further comprising a copper-silver ionization loop for water treatment upstream of the centrifugal separator.

17. A water filtration and disinfection device as claimed in claim 9 wherein the sidestream treatment device further comprises a suction strainer.

18. A water filtration and disinfection device as claimed in claim 9 further comprising a filter bag housing for filtering water downstream of the centrifugal separator.

19. A water filtration and disinfection device as claimed in claim 18 wherein the filter bag housing comprises a water sequestration system which includes one or both of a DC rectifier and a cathode.

20. A water filtration and disinfection device as claimed in claim 1 wherein the sidestream treatment device comprises a multi media filtration system.

21. A water filtration and disinfection device as claimed in claim 20 wherein the multimedia filtration system comprises a filtration chamber comprising layers of the following: sand; zeolite; activated carbon; and pebble lime stones.

22. A water filtration and disinfection device as claimed in claim 21 wherein the layers have a sintered screen between them.

23. A water filtration and disinfection device as claimed in claim 20 wherein the filtration chamber has a rotating wand with spray nozzles thereon formed in the filtration chamber.

24. A water filtration and disinfection device as claimed in claim 20 further comprising an array of UV light located within the filtration chamber.

25. A water filtration and disinfection device as claimed in claim 20 further comprising a backwash connector pipe with slots formed within the filtration chamber.

26. A water filtration and disinfection device as claimed in claim 20 further comprising a copper/silver ionizer for introducing copper and silver ions into the water in the filtration chamber.

27. A water filtration and disinfection device as claimed in claim 20 further comprising deflector plates formed within the filtration chamber for deflecting water entering the filtration chamber.

28. A water filtration and disinfection device as claimed in claim 20 further comprising a filter bag positioned outside of the filtration chamber.

29. A water filtration and disinfection device as claimed in claim 20 further comprising a suction strainer positioned outside of the filtration chamber.

30. A water filtration and disinfection device as claimed in claim 20 further comprising an ozonator for the treatment of water after it has passed through the filtration chamber.

31. A water filtration and disinfection device as claimed in claim 20 further comprising a precipitator for the treatment of water after it has passed through the filtration chamber.

32. A water filtration and disinfection device as claimed in claim 20 further comprising a reservoir for filtered disinfected backwash water for selectively receiving water discharged from the filtration chamber and returning it to the filtration chamber through a micronic screen filter.

* * * * *